(12) United States Patent
Pilskalns et al.

(10) Patent No.: US 8,862,497 B2
(45) Date of Patent: Oct. 14, 2014

(54) METHOD AND SYSTEM OF DETERMINING AND ISSUING USER INCENTIVES ON A WEB SERVER VIA ASSESSMENT OF USER-GENERATED CONTENT RELEVANCE AND VALUE

(75) Inventors: Orest J. Pilskalns, Vancouver, WA (US); Adam McDonald, Vancouver, WA (US); Kevin Karpenske, Vancouver, WA (US)

(73) Assignee: Washington State University Research Foundation, Pullman, WA (US)

( * ) Notice: Subject to any disclaimer, the term of this patent is extended or adjusted under 35 U.S.C. 154(b) by 1748 days.

(21) Appl. No.: 11/968,613

(22) Filed: Jan. 2, 2008

(65) Prior Publication Data
US 2008/0172288 A1   Jul. 17, 2008

Related U.S. Application Data

(60) Provisional application No. 60/883,124, filed on Jan. 2, 2007.

(51) Int. Cl.
*G06Q 30/02* (2012.01)
(52) U.S. Cl.
CPC ............ *G06Q 30/02* (2013.01); *G06Q 30/0273* (2013.01); *G06Q 30/0222* (2013.01)
USPC .................................................... 705/14.11
(58) Field of Classification Search
USPC .......................................................... 705/14
See application file for complete search history.

(56) References Cited

U.S. PATENT DOCUMENTS

| | | | |
|---|---|---|---|
| 6,343,990 B1 * | 2/2002 | Rasmussen et al. | ............ 463/25 |
| 6,415,264 B1 * | 7/2002 | Walker et al. | ................ 705/26.3 |
| 7,698,165 B1 * | 4/2010 | Tawakol et al. | ............... 705/14.4 |
| 2003/0014311 A1 * | 1/2003 | Chua | ............................... 705/14 |
| 2004/0064704 A1 * | 4/2004 | Rahman | ........................ 713/182 |
| 2006/0241859 A1 * | 10/2006 | Kimchi et al. | ................. 701/208 |
| 2007/0032244 A1 * | 2/2007 | Counts et al. | ............. 455/456.1 |

* cited by examiner

*Primary Examiner* — James A Vezeris
(74) *Attorney, Agent, or Firm* — Barry L. Davison; Davis Wright Tremaine LLP

(57) ABSTRACT

Provided are computer implemented methods for rewarding a user of a web-based application, comprising: providing a web-based application accessible by a plurality of users via an interface, wherein the application interface provides for user-directed posting and retrieval of content relating to the application; monitoring use by the plurality of users of user-specific content; assessing a value of the user-specific content; determining an incentive or reward, based on the assessed value of the user-specific content; and providing the specific user with the determined incentive or reward. Also provided is a computer network apparatus or system for rewarding a user of a web-based application. Further provided are methods of data mining, comprising: providing a web-based application (e.g., geospace, E-marketing, E-photo) for sharing posted application information accessible by a plurality users using client-server interfaces; monitoring use by the plurality of users of posted data content; and identifying a subset of users thereby.

19 Claims, 6 Drawing Sheets

METHOD AND SYSTEM OF DETERMINING AND ISSUING USER INCENTIVES ON A WEB SERVER VIA ASSESSMENT OF USER-GENERATED CONTENT RELEVANCE AND VALUE

CROSS-REFERENCE TO RELATED APPLICATIONS

This application claims the benefit of priority to U.S. Provisional Patent Application No. 60/883,124, filed 2 Jan. 2007 and entitled "METHOD AND SYSTEM OF DETERMINING AND ISSUING USER INCENTIVES ON A WEB SERVER VIA ASSESSMENT OF USER-GENERATED CONTENT RELEVANCE AND VALUE," which is incorporated herein by reference in its entirety. This application is also related to Applicants' pending U.S. patent application Ser. No. 11/465,731 filed on Aug. 18, 2006 and entitled "STRATEGIES FOR ANNOTATING DIGITAL MAPS," which is also incorporated herein by reference in its entirety.

FIELD OF THE INVENTION

Aspects of the invention relate generally to web based tools and e-commerce tools that incorporate user-generated web content, and more particularly to novel methods for providing a reward and/or incentive to a user based on the value of the user's content.

SUMMARY

Provided are computer implemented methods for rewarding a user of a web-based application, comprising: providing a web-based application accessible by a plurality of users via an interface, wherein the application interface provides for user-directed posting and retrieval of content relating to the application; monitoring use by the plurality of users of user-specific content; assessing a value of the user-specific content; determining an incentive or reward, based on the assessed value of the user-specific content; and providing the specific user with the determined incentive or reward. Also provided is a computer network apparatus or system for rewarding a user of a web-based application. Further provided are methods of data mining, comprising: providing a web-based application (e.g., geospace, E-marketing, E-photo) for sharing posted application information accessible by a plurality users using client-server interfaces; monitoring use by the plurality of users of posted data content; and identifying a subset of users thereby.

Particular aspects provide a computer implemented method for rewarding a user of a web-based application, comprising: providing a web-based application accessible by a plurality users using client-server interfaces, wherein the application interface provides for user-directed posting and retrieval of user-provided content relating to the application; monitoring use by the plurality of users of content posted by a specific user; assessing a value of the content posted by the specific user; determining an incentive or reward, based on the assessed value of the content posted by the specific user; and providing the specific user with the determined incentive or reward. In certain embodiments, the web-based application comprises at least one of a geospace system for sharing information in a geospatial context, an E-Marketplace web-based application, and an E-Photo Storage Site web-based application. In particular aspects, the content posted by the specific user comprises at least one of geospatial data, items for sale and digital images for viewing or sale. In certain embodiments, the geospatial data comprises at least one selected from the group consisting of maps, map annotations, map modifications, map path or routes, text, hyperlinks, geospatial data associated electronic files, music files, digital photographs, images and digital multimedia files. In certain implementations, monitoring use by the plurality of users of content posted by a specific user comprises the monitoring of any third party activity related to the specific user's content. In certain embodiments, the third party activity is selected from the group consisting of the number of 'hits' the specific user's content receives, the number of times the specific user's content is retrieved from a database, the number of unique users viewing the specific user's content, the number of users opening a user account after viewing the specific user's content, and the number of sale items viewed or purchased based on specific user's content. In particular embodiments, advertising information is associated with the specific user's content, and monitoring comprises determining the total amount of advertising revenue generated based on third party viewing of the content-associated advertisement. In certain embodiments, third party users are charged to view the specific user's content, and monitoring comprises determining a total amount of revenue generated by viewing of the content. In preferred aspects, the application comprises a geospace system for sharing information in a geospatial context having a zoom level feature wherein user-specific content is associable with one or more zoom levels, and wherein monitoring comprises tracking of a combination of zoom level, location, and time spent viewing a location at a specific zoom level, uniquely allowing identification of a specific user subset. In certain aspects, assessing the value of the content posted by the specific user comprises at least one of determining a number of 'hits' received by the specific user's content, determining the number of times the specific user's content is retrieved from a database, determining the number of unique users viewing the specific user's content, determining the number of users opening a user account after viewing the specific user's content, determining the total amount of advertising revenue generated based on third party viewing of user-specific content-associated advertisement, determining a total amount of revenue generated by viewing of the content, and determining the number of sale items viewed or purchased based on specific user's content. In certain embodiments, determining an incentive or reward, based on the assessed value of the content posted by the specific user comprises at least one of determining an amount of additional storage space on the server, determining an amount of access to special features of the web-based application, determining an amount of access to "professional" or subscription fee-based tools, determining an amount of access to cooperative third party web-based services, and determining an amount of free publicity or promotion. In certain embodiments, providing the specific user with the determined incentive or reward comprises at least one of providing an amount of additional storage space on the server, providing an amount of access to special features of the web-based application, providing an amount of access to "professional" or subscription fee-based tools, providing an amount of access to cooperative third party web-based services, and providing an amount of free publicity or promotion.

In certain aspects, the method further comprises determining a value of the user, based on the value of the user-specific content or a subset thereof.

Additional aspects provide a computer network apparatus or system for rewarding a user of a web-based application, comprising: a server having a processor and at least one storage device connected to the processor; a server-based application accessible by a plurality users using client-server interfaces, wherein the application interface provides for user-directed posting to, and retrieval from the server of user-provided content relating to the application; a database of content posted by the plurality of users; a stored software program operative with the processor to monitor use by the plurality of users of content posted by a specific user, assess a value of the content posted by the specific user, and determine an incentive or reward, based on the assessed value of the content posted by the specific user; and provide the incentive or reward to the user. In certain aspects, the server-based application comprises at least one of a geospace system for sharing information in a geospatial context, an E-Marketplace web-based application, and an E-Photo Storage Site web-based application. In particular embodiments, the content posted by the specific user comprises at least one of geospatial data, items for sale and digital images for viewing or sale.

Further aspects provide a method of data mining, comprising: providing a web-based geospace application for sharing information in a geospatial context accessible by a plurality users using client-server interfaces, wherein the application interface provides for user-directed posting and retrieval of user-provided geospatial data content relating to the application; monitoring use by the plurality of users of geospatial data content posted by one or more users; identifying a subset of users based on the monitored use of a defined subset of the posted geospatial data content; and providing the identified user subset to an acquiring entity for use in targeting, soliciting or otherwise interacting with the subset of users. In certain embodiments, the geospatial data comprises at least one selected from the group consisting of maps, map annotations, map modifications, map path or routes, text, hyperlinks, geospatial data associated electronic files, music files, digital photographs, images and digital multimedia files. In certain implementations, the geospace application for sharing information in a geospatial context comprises a zoom level feature wherein user-specific content is associable with one or more zoom levels, wherein monitoring comprises tracking of a combination of zoom level, location, and time spent viewing a location at a specific zoom level, uniquely allowing identification of a specific user subset.

DETAILED DESCRIPTION

Particular aspects are directed toward a web-based tool for determining the relevance or value of user-generated web content to a third party (e.g., persons viewing the content, and/or a web-based service provider providing the content to the persons viewing it) and providing a reward and/or incentive (e.g., additional server storage space, and/or access to special features of the web based application such as preferred placement, and/or access to 'professional' or subscription fee-based tools, and/or free access to other (cooperative) web companies' service, and/or free publicity and/or promotion, and the like.) to the user based on the value of the user's content.

Particular aspects may be understood with reference to the following examples.

EXAMPLE 1

Exemplary GeoMonkey™ Application Embodiment Comprising Reward and/or Incentive Based on User Content Value In one embodiment, the present invention may be used to determine the value of user-generated content that includes maps. Specifically, a web-based application referred to as GeoMonkey™ (Appendix A of this Example 1; "Preferred GeoMonkey Embodiments," below) can be used to generate maps based, at least in part, on user input; a geospace system for sharing information in a geospatial context. As with many" web-based applications, the functionality of the GeoMonkey™ application may be divided between a web server and client computers that access the web server via the World Wide Web. As is appreciated by those of ordinary skill in the art, software for accessing the Internet and communicating with the web server, such as a web browser, may be installed on the client computer. Additional computers and databases may be communicatively coupled to the web server to provide additional storage space, information, and/or functionality.

The web server of the GeoMonkey™ application may also access other computers coupled to the Internet. For example, a client computer may send a request for a map (or other geospatial data) to the web server of the GeoMonkey™ application. The web server may access another computer via the World Wide Web to obtain data necessary to provide the requested map to the client computer. The data may then be forwarded to the client computer. In one embodiment, the map (or other geospatial data) may be provided by a third party mapping API (e.g., maps.yahoo.com) installed on a third party computer and accessible to the web server of the GeoMonkey™ application via the Internet.

Figure 1:
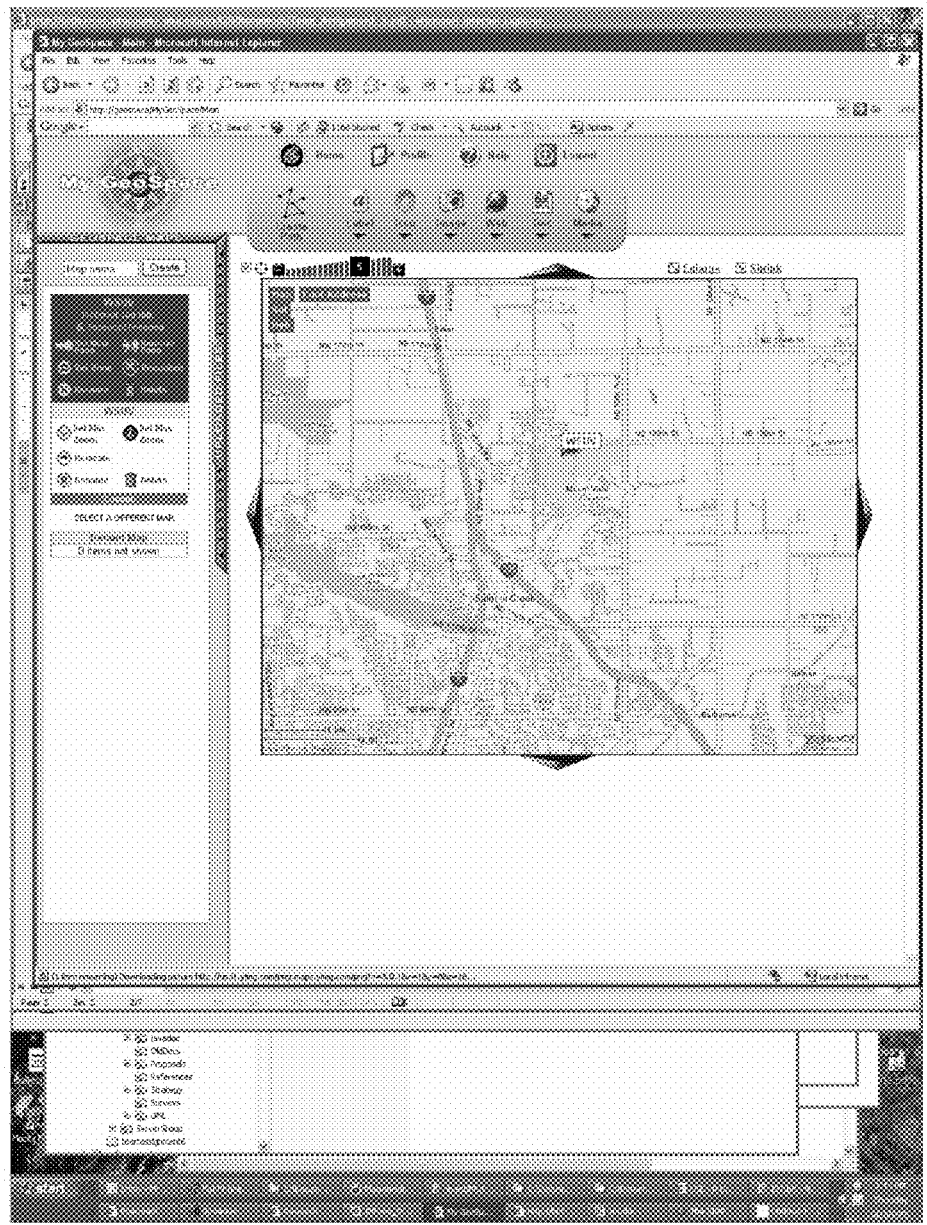
FIG. 1 shows a screen shot of a web-based geospace application for sharing information in a geospatial context accessible by a plurality users according to Example 1, herein.
Figure 2:
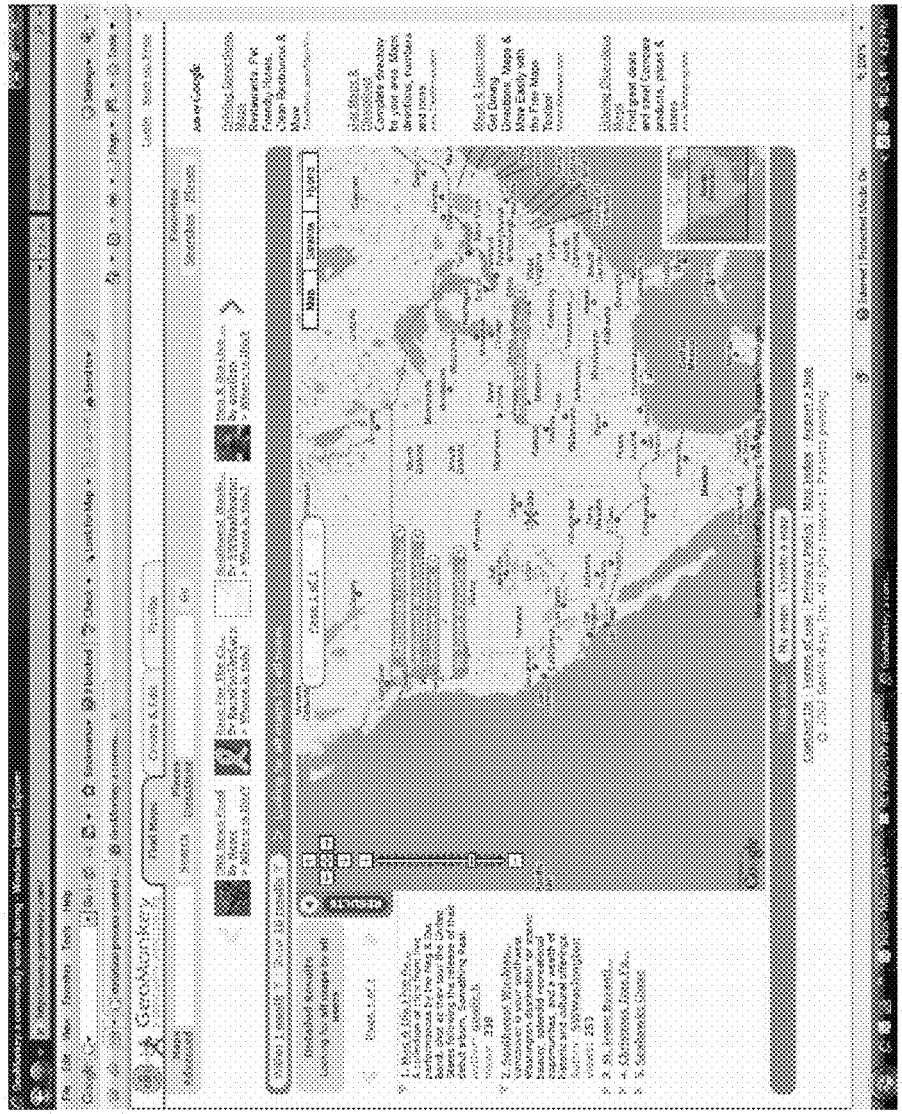
FIGS. 2-6 show, according to additional embodiments, additional mapping screen shots of a web-based geospace application for sharing information in a geospatial context accessible by a plurality users according to Example 1, herein.
Figure 3:
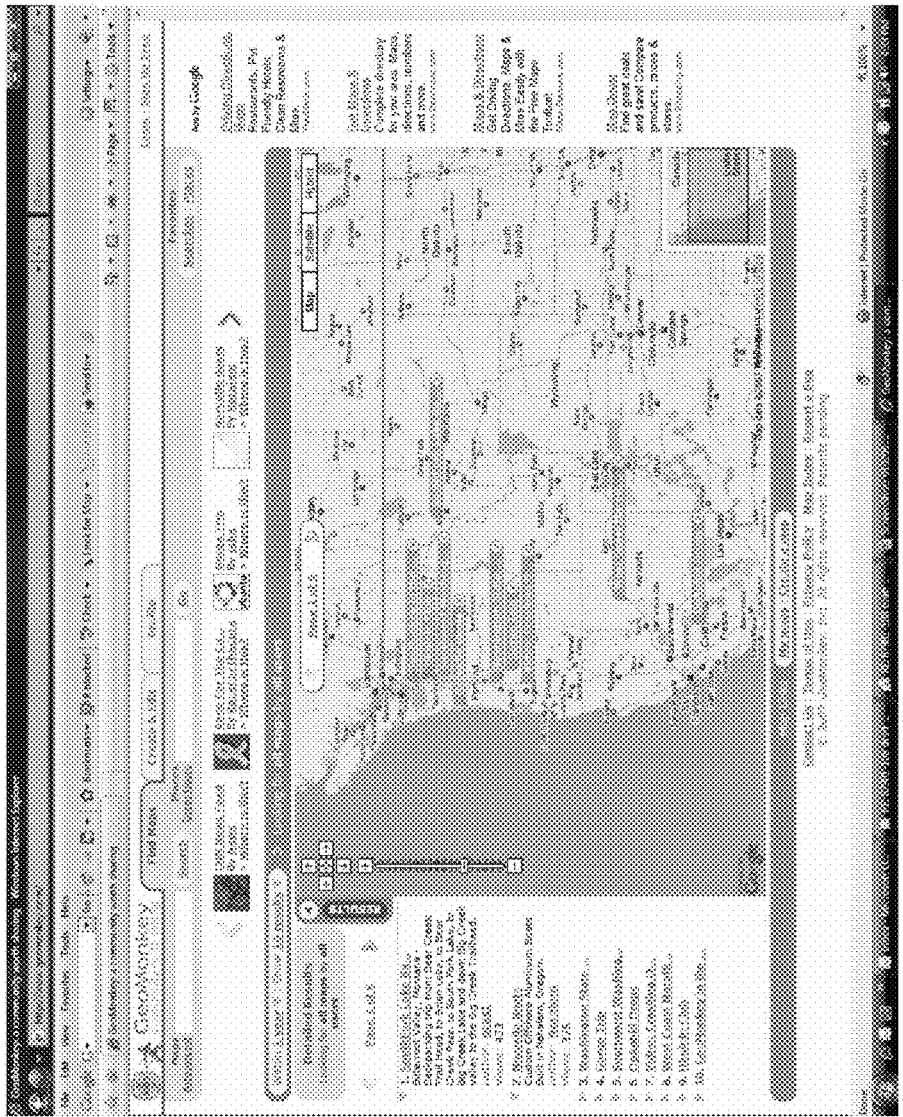
Figure 4:
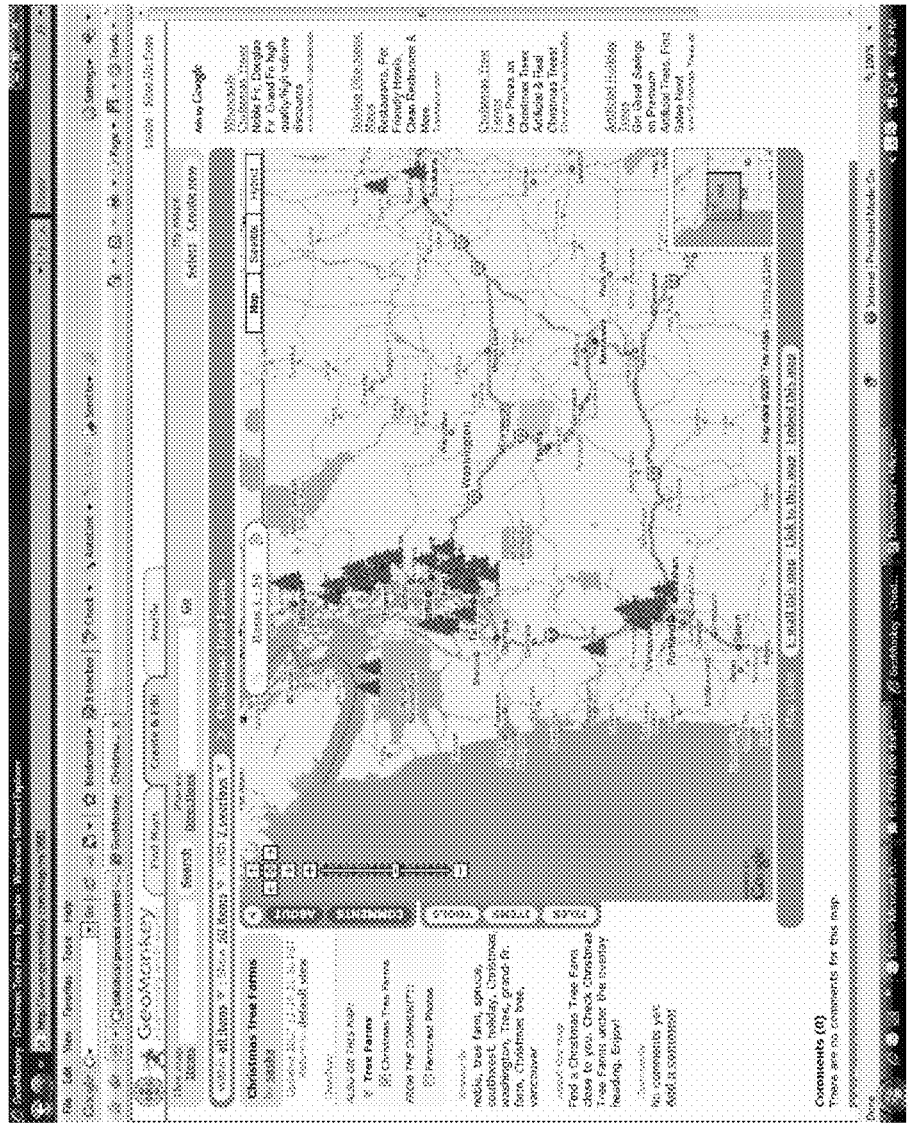
Figure 5:
Figure 6:
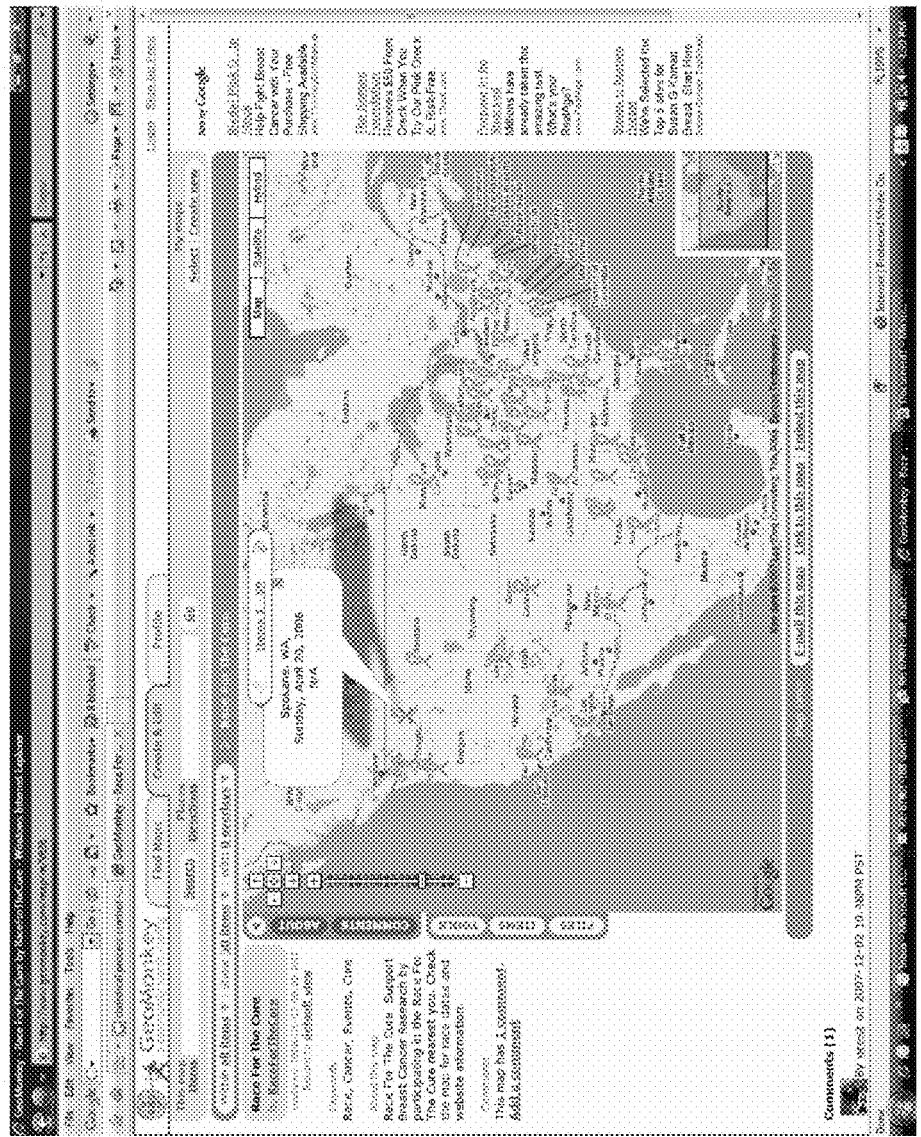

The web server of the GeoMonkey™ application provides a user interface to the client computer that allows the user to send the request for a map to the web server and display the data received from the web server. The user interface may include an image or map viewer that displays an interactive map using the map data sent to the client by the web server. FIG. 1 is a copy of an exemplary user interface of the GeoMonkey application (see APPENDIX A of this Example 1), and shows an interactive map. The interactive map may be viewed using an image viewer installed on the client computer. In one embodiment, the user interface includes a special viewer for images, such as a plug-in installed in the web browser or a viewer generated using dynamic html. The interactive map includes interactive features such as panning and zooming (e.g., see Appendix A under IV; Use-Case Examples). The user may use these interactive features to create a view of the geographic map data that has significance to the user (Id). The map view may include a subset of the map data sent to the client computer by the web server. As appreciated by those of ordinary skill in the art, the client computer may send requests to the web server and/or third party computer to receive additional data required to support the interactive features of the interactive map. For example, zooming into a region of the interactive map may require additional data. To support the zooming feature, the client computer may request additional data from the web server and/or third party computer upon which the third party mapping API is installed.

After the user has created the map view, the user can annotate the map view (see see Appendix A, items 8, 10, and 11 under IV. Use-Case Examples). FIG. 1 includes the annotation "WSUV" in a box with an arrow portion pointing to the geographic location corresponding to the text. Additionally, the user may associate information and content such as text, hyperlinks, and the like with geographic locations present in the map view. Further, a user may associate electronic files with geographic locations. These electronic files may include music files, digital photographs, images, digital multimedia files, and the like. Using the GeoMonkey™ application, users can associate any type of file with a geographic location. To store electronic files on the web server or a computer communicatively coupled thereto, the GeoMonkey™ application includes a file-upload interface (e.g., see see Appendix A, item 7 under IV; Use-Case Examples). Methods and apparatuses for uploading electronic files and generating hyperlinks to those files are well known in the art.

The GeoMonkey™ application also contains a path or route creation tool that allows the user to specify a route on the map and link content to the route interface (e.g., see Appendix A, item 11 under IV; Use-Case Examples). One exemplary use of this tool includes specifying a road trip on the map view and then associating photographs taken at various locations during the road trip with the corresponding locations on the map view. The user interface also allows users to add web links to the map view that will associate web content with the geographic location on the map view. The map view and all information/content associated with that map view added by the user is referred to hereafter as "geospatial content."

A user may wish to save geospatial content for future viewing and/or sharing. In particular, the user may wish to share his/her map views with others and/or view map views created by others based on geographic location. In one embodiment, all of the geospatial content is stored in a memory in communication with a web server, and the data entered by a map creator (author) remains unchanged. However, the underlying map (which gives the author's data geospatial context) is always dynamically loaded, so a new road subsequently entered (e.g., by another user) would appear even though the author of the map did not explicitly add the road.

To manage the storage space on the server, a user account may be created for each user (e.g., see Appendix A, item 2 under IV; Use-Case Examples). The instructions for creating a user account may reside on the web server and may provide a user interface that allows users to apply for and/or create an account by submitting personal information such as their name and email address. The instructions for creating a user account may assign a predetermined amount of storage space to each user. In one embodiment, all new users are assigned the same amount of storage space. The instructions for creating a user account may provide the user with a user name and password. Geospatial content created by users with accounts and stored on the server within the allocated space is referred to hereafter as "content."

The content may be stored in files in memory or in a database configured to store the content. In particular embodiments, for example, the data model is based upon object-oriented data structures that represent the articles that can be displayed upon a map. The database may reside on the web server and/or on another computer in communication with the web server.

The system allows the user to 'publish' his/her content, by placing (at the user's request) the content in a location where it can be accessed using a world wide web URL interface (e.g., see Appendix A, item 12 under IV. Use-Case Examples). For example, a 'publish' button is provided on an author's map, and when the author clicks/selects this button a new web accessible page is generated that represents the author's map. In particular embodiments, the new webpage retrieves the most recent map data each time it is accessed. In certain embodiments, authors can publish to various community maps, (e.g. an events community map may contain a link to an author's marathon map)]. In particular aspects, client computers other than the user's may send a request to the web server to view the user's content. If the user has indicated to the web server that his/her content may be shared with the requester, the web server will send the content to the requestor's client computer for viewing.

In particular aspects, because a user's content may be viewed by others requesting to view it, data related to such requests to view the content may be monitored and/or collected. Particular aspects of the present invention are directed toward determining a value of a user's content and rewarding the user based on the assessed value of the content. Particular aspects include methods and/or instructions for monitoring third party activity with respect to the user's content and determining the value of the user's content based on the activity monitored. These methods and/or instructions may be executed by the web server and/or database.

The instructions for monitoring third party activity may monitor any third party activity related to user's content. For example, the instructions may count the number of times the content is viewed and/or the number of visitors viewing the content. If advertisements are included with the content or added to the user interface for viewing the content, income may be generated based on the display of the advertisements. Further, users may be charged to view content. The instructions may total the amount of revenue generated by the content (i.e., total the advertising revenue generated and/or fees collected related to viewing the content), and the like.

Methods of monitoring activities such as counting the number of hits a website receives, the number of times a record is retrieved from a database, calculating advertising revenue, and determining the number of unique users viewing the content are well known in the art. The present invention is not limited by the method used to monitor activity related to the content. In particular novel embodiments, a combination of zoom level, location, and time spent viewing a location at a specific zoom level is tracked, uniquely allowing targeting of a segment of the population based upon a very specific location and their interest based on time spent between clicks.

Particular aspects comprise instructions for determining the value of the content using data collected by the monitoring instructions. The data collected may be compared to one or more predetermined categorical 'threshold' values to determine the value of the content. For example, content viewed by more than a predetermined number of visitors may be considered "valuable." Additionally, or alternatively content viewed by visitors that subsequently apply for user accounts may be considered more "valuable" than content viewed by visitors that do not apply for accounts. Content viewed by visitors that click on advertisements may be considered more "valuable" than content viewed by visitors that do not. Additionally, or alternatively the data collected related to a first content (e.g., geospatial content created with respect to a single map view) may be compared to the data collected related to a second content or all of the other content to determine the popularity of the first content. The popularity of the content may be used to determine its value.

Certain aspects may comprise instructions that may use the value of the user's content to determine a value of the user. For example, the value of the user may be determined based on the collective or aggregated value of all of the user's content or a subset thereof. Additionally, the data collected related to the content of a first user may be compared to the data collected related to another user or all of the other users to determine the popularity of the first user's content. The popularity of the user's content may be used to determine the value of the user. While exemplary methods for evaluating the value of the content and/or user have been provided herein it is apparent to those of ordinary skill in the art that a number of other application based metrics may also be used and are within the scope of the present invention. In preferred aspects, user value metrics are normalized based upon time.

Particular embodiments comprise instructions for determining an incentive and/or reward based upon the assessed value of the content and/or the value of the user. For example, in certain embodiments, a user receives X MB of additional space (see also list herein below). Instructions for determining an incentive and/or reward may be executed by the web server. In one embodiment, the user earns additional storage space by providing content that is determined to be "valuable" (e.g., deserving of reward and/or incentive), or is determined to be of some categorical level of relative value. In particular embodiments, a scale or internal scale is used, where the size of rewarded free storage is related directly or indirectly to an assessed degree of popularity.

In certain aspects, the incentive and/or reward comprises additional free server storage space, and/or access to special features of the web based application. For example, certain maps may be 'highlighted' on the home page. A reward or incentive may comprise access to "professional" or subscription fee-based tool, and/or free access to other (cooperative) web companies' service, and/or free publicity and/or promotion, and the like. The instructions for awarding the incentive and/or reward to the user may be executed by the web server. For example, these instructions may instruct the web server to allocate more storage space, service access, etc., to the user.

Appendix A of Example 1

Preferred GeoMonkey Embodiments

I. Overview

Certain aspects of the invention relate generally to web based tools and geospacial content mapping, and more specifically to web based tools for creating custom 'geospatial registered' content that can be saved, edited, and presented interactively via the World Wide Web to a user-selected audience; a geospace system for sharing information in a geospatial context.

In particular aspects, a Geospace System comprises a web based tool (works in any web browser with a web connection, visit http://geospace.vancouver.wsu.edu) for creating custom "geospatial registered" content that can be saved, edited, and presented interactively via the World Wide Web to an audience of the users choosing. Geospatial registered content means that the system uses interactive maps to associate user data with location. The Geospace System uses a third party mapping API (maps.yahoo.com) to generate the geospatial content (maps). The system allows users to add their own data to the maps and allows them to save that data associated with a location or locations for future viewing or sharing. Thus the system stores user information in a customized geo-spatial database. The system allows the users to "publish" their customized data and maps, by placing (at the users request) the content in a location where it can be accessed using a world wide web URL. In addition, the system allows users to place privacy restrictions on their data. By default the data is not publicly available. The user can than choose to make it public to the whole world, or they can make it available using password protection.

In certain embodiments, users can upload any type of file and associate that file with a location. The system has a special viewer for images. Users can store and share images based on location. Users can create annotations on the map. The system also contains a path creation tool that allows users to label and specify paths within a geospatial context (map). One common use for this tool is to specify a road trip on a map, and then upload pictures that were taken at various locations. The system also allows users to create web links on a map. Thus if a first user is zoomed into a second user's map showing, e.g., the WSU Vancouver campus, the first user will see a link to the second user's webpage.

In certain aspects, one of the key functions of the system is the ability to specify the zoom level at which a geo-located item becomes visible. Without this property maps can quickly become cluttered, because every uploaded item will be displayed no matter what the zoom level (see use-case 14 in section III). Uploading/managing data files have been uncoupled, with/by geo-spatially placing the data file. This allows users to place geo-spatial links at several locations on a map that all reference the same data file (see use-cases 7 & 8 in section III).

There are applications such as MapQuest.com which allow viewing of selected maps; however, the current systems do not allow the user to save the particular map view and then share it with another user. Users of this system can interact with maps and at any time save the current view of the map (which may contain uploaded data). Thus users can create as many different map views as they desire and save those views.

II. Applications and Exemplary Embodiments

One particular aspect of interest is the ability to build web based communities around sharing information through geo-location. There are many opportunities to customize this system for a specific market. Most subject matter can be geo-located and shared with others, whether it is for personal or commercial reasons. Examples of exemplary embodiments include but are not limited to:

(A) In one scenario, a news story unfolds wherein a major event occurs and is witnessed and photographed by a user. With this system available, the user could login, locate the site of the news story on the map, mark it with an annotation, upload the images, and publish. Pretty soon the URL to this map would circulate all over the web. People would send the link to their friends, creating a social network based around the Geospace System.

(B) Fishermen on the Columbia River. Fishermen need geo-located data from several different sources, including tide information, weather, currents, etc. This system can provide customized content that caters to specific groups of people, thus advertising could be narrowly focused.

(C) Travel Guides can be created by individuals to map out their vacations and then later add their photos for each stop they make.

Travel agencies, Airlines, Cruise lines, Touring companies etc. can map out specific travel packages or destinations complete with photos linked to the exact location of where they were taken.

(D) Specific travel interests can be mapped for different industries. For example—Vineyards and wine tasting rooms in Napa Valley, Antique car shows in the Northwest, Summer fairs and festivals in Washington, Family vacation destinations, Hiking trails and campgrounds, or even Sports & Entertainment venues.

(E) Genealogy is one of the fastest growing areas of popular research by individuals and scholars alike. They can map an ancestor's journey to a new land or pinpoint with photos where all their relatives have resided.

(F) Auto Fuel—see on one map all the current gasoline or diesel prices in your area and where they are located.

(G) News—see the major headlines for news in your area and where they took place.

(H) Real Estate agents can map their listings complete with photos and share them with their clients. Clients can then see on one map exactly where the house is located and what is around it. The most important factor in Real Estate—Location. Location. Location.

(I) Other items for sale—map where your car is on display with a photo so interested parties can go look at it with convenient instructions.

(J) Farms to buy fresh produce. So many farmers have decided to diversify their business to survive. Many have opened up their farms for U-Pick opportunities, added entertainment such as rides and cooked foods or created festivals such as the Lentil Festival in Pullman, Wash.

(K) Professional Conferences can be mapped with their locations and specific information such as deadlines and fees.

(L) National and international chains can map their store locations complete with photos of their store, directions and a listing of services.

With each niche market, web traffic will be created and an opportunity to sell advertising space will arise specifically for that market. Advertising schemes include, but are not limited to linking advertisements to the geographic location of a particular map, or providing ad space on the screen, next to a relevant map. Advertising sources include, but are not limited to small local businesses, large national chains, state or federal institutions and governments, individuals, etc.

III. Additional Embodiments

In additional embodiments, users are allowed to search published maps using a bounding box. The user of the system will be able specify a bounding box on a "search map interface", as well as the type of information they are looking for (map, pictures, newsfeed, pdfs, etc) and keywords. By clicking on the search button, the user will start a complex query engine that will use this geo-spatial database to search on both location (using the bounding box), data type, and keywords. The search interface will return links to all published data that is within the bounding box, and meets the data type and keyword criteria.

In other embodiments, a "news feed" database is created. The news feed database uses "spiders" (programs which browse the World Wide Web in a methodical, automated manner) to search for RSS (real simple syndication) feeds online and establish their geo-location using information inside the feed or network information. Once the geo-location has been establishing, the spider will create a record in the database giving the geo-location, the web address of the RSS, as well as keywords. Users can then use the search engine (specified in new additions 1) to read news for specific locations.

In other embodiments, adapters are developed to read a wide variety of geo-spatial data formats, including but not limited to GPS data. This implementation would allow the system to be amenable to several niche markets; for example, running clubs who use a specific data format to record running information. Any type of data could be geo-located, and users could be allowed to share that data.

IV. Use-Case Examples

In software engineering, a use case is a technique for capturing the potential requirements of a new system or software change. Each use case provides one or more scenarios that convey how the system should interact with the end user or another system to achieve a specific business goal.

1 Display Login Webpage
 Actor: Web user
 Pre-condition: User has internet access and a web browser.
 Main Scenario:
  1. User navigates their web browser to the hosted site.
  2. Web browser displays hosted site.
 Post Condition:
  User is on the geospace login page.
 Exception: The web page is unable to load for any reason.
 Alternative Actions:
  1. An error message will display on the main page stating the reason why the web page could not be displayed properly.

2 Create User Account
 Actor: Web user
 Pre-condition: Use-Case 1 Display Login Webpage.
 Main Scenario:
  1. The user clicks on create account.
  2. User's browser opens create account web page
  3. User enters login name, e-mail, and password twice for verification.
  4. The user clicks the create account.
  5. Browser Display's User Homepage Use-Case 6.
 Post Condition:
  User is logged in and his 'home page' is displayed. A default map is selected in the view toolbar. The boundaries of this map are used to display a world region in the Yahoo map.
 Exception: User name already exists.
 Alternative Actions:
  1. User starts over with a new login name.

3 User Logs into System
 Actor: Web user
 Pre-condition: Use-Case 2 Create User Account (successfully).
 Main Scenario:
  1. The user enters in login name and password.
  2. The user clicks login button.
  3. The user's home page with all interface tools is displayed. Some default view is selected and used to display the Yahoo map.
 Post Condition:
  User is logged in and on his 'home page'. A default map is selected in the view toolbar. This map's boundaries are used to display a world region in the Yahoo map.

4 User Logs Out of System
 Actor: Web user
 Pre-condition: User is on his Home Page.
 Main Scenario:
  1. User clicks on logout hyperlink.
  2. Browser displays main page with login displayed.
 Post Condition:
  User is on the geospace login page. His login status is displayed above the name and password text fields.

5 Creating a Map View
  Actor: Web User
  Pre-condition: User is on his Home Page.
  Main Scenario:
    1. The user inserts a title for the new map then clicks on the new map button.
    2. The system responds by adding the map to the map view list.
    3. The new map moved to the top of the list and is highlighted to indicate it is selected. Any map that was previously selected returns to its former position in the list.
  Post Condition:
    The view associated with the selected map has been used to change what section of the world the Yahoo map displays.
6 Selecting a Map View
  Actor: Web User
  Pre-condition: User is on his Home Page.
  Main Scenario:
    1. The user moves his cursor to the map list toolbar, and then clicks on the name of an available map.
    2. The selected map is moved to the top of the list and highlighted. Any map that was previously selected returns to its former position in the list.
  Post Condition:
    The view associated with the selected map has been used to change what region of the world is displayed by Yahoo maps.
7 Uploading a Document
  Actor: Web User
  Pre-condition: User is on his Home Page.
  Main Scenario:
    1. The user clicks on the upload document area.
    2. The system responds by bringing up a file transfer window.
    3. The user browses to the directory which contains the file to be uploaded.
    4. The user selects the file to be uploaded and clicks okay in the file directory window.
    5. The system responds by opening a modal window requiring the user to name the file that is uploaded.
    6. The user names the file to be uploaded and clicks okay.
    7. The file is added to the uploaded files area.
  Post Condition:
    A new FiledArticle is visible in the FiledArticle toolbar. It can now be linked to the map using the 'Add An Image' use case. The link associated with the map and image is displayed as a link beneath the selected map.
8 Adding a Picture (or Other FiledArticle) to the Map
  Actor: Web User
  Pre-condition: User is on his Home Page.
  Main Scenario:
    1. The user must first select a location on the map that they wish to add the icon.
    2. The user must click on the tool labeled "Image" (doc, or media).
    3. A dropdown menu appears listing all Picture articles
    4. The user selects a named article from the dropdown menu.
    5. He clicks on the button 'Add Article'
    6. A popup dialog asks the user to name the displayed article.
    7. When completed, an icon representing the picture (doc, media) appears on the map.
  Post Condition:
    The selected view in the view toolbar shows a new link for the added picture. In the yahoo map display, a clickable icon is displayed representing the type of linked article (camera for picture . . . etcetera).
9 Interacting with the Map/Image Interface
  Actor: Web User
  Pre-condition: User is on his Home Page.
  Main Scenario:
    The first time the user logs into the homepage the map interface should provide a world map. Additional logins should display the last map used by the user.
    1. The first time the user logs into the homepage the map interface should provide a world map. Additional logins should display the last map used by the user.
    2. The user can choose to use scaling buttons to increase or decrease the view scale.
    3. The user can expand and shrink the map display rectangle.
    4. The user can scroll in the cardinal directions using arrow buttons.
    5. The user can double click to scroll to a location
    6. The user can click and drag to change the perspective.
  Post Condition:
    The displayed view shows an area of the world which the user has selected.
    This display is not directly associated with any views in the view toolbar.
10 Adding an Icon to the Map
  Actor: Web User
  Pre-condition: User is on his Home Page.
  Main Scenario:
    1. The user must first select a location on the map that they wish to add the icon.
    2. The user must click on the icon labeled "ICON"
    3. A dropdown menu will appear. The user will need to click on the down arrow and menu options will then appear. The user can then choose either to add:
      a. House
      b. Bank
      c. Church
      d. Telephone
    4. The user will now need to click the "Add Icon" button. This will display a popup window that prompts the user to enter in a title for the icon.
    5. The user will need to enter in a title for the icon in text area provided by the popup window. Once completed, the user has to click the "OK" button and the icon that was selected will be placed at the location previously determined.
  Post Condition:
    A new link is listed in the selected map which is associated with the path.
11 Adding a Path to the Map
  Actor: Web User
  Pre-condition: User is on his Home Page.
  Main Scenario:
    1. The user clicks on the add path icon which puts the system into path mode.
    2. The user clicks on the map adding the desired path.
    3. When the user is finished the user clicks the add path icon which takes the system out of path mode.
  Post Condition:
    A new link is listed in the selected map which is associated with the path.

12 Publishing a Map View
  Actor: Web User
  Pre-condition: User is on his Home Page and has at least one View in his View Toolbar.
  Main Scenario:
    1. The user moves his cursor over a view in the view toolbar.
    2. The user clicks on the lock icon which trails the map name.
    3. The lock icon switches from a closed lock icon to an open lock icon.
  Post Condition:
    The target view is now published and accessible via published map viewing.
13 Examining a Published Map View
  Actor: Web User
  Pre-condition: User is on the Login Page.
  Main Scenario:
    1. The user clicks on the link, "browse published maps".
    2. The page changes, prompting the user to enter the name of a publisher.
    3. The user clicks on 'Search'
    4. All published GeoViews associated with the entered name are displayed as clickable links.
    5. The user clicks on a link.
    6. The user enters a Published Map Page. This displays the location and contents of the selected view using Yahoo maps with movement tools.
  Post Condition:
    The user is on a Published Map Page. The map he selected is displayed. The same navigations tools are used as in Use-Case 9.
14 Setting the Zoom Level of an Article on the Map
  Actor: Web User
  Pre-condition: User has selected a map and has clicked on an article. The default zoom level values for an article span the entire range. Thus the upper bound is set to the greatest value and the lower bound is set to the smallest value. Thus the default values allow the article to be seen at all zoom levels. (However, this might result in cluttering up maps at high zoom levels, thus we added this use-case to allow users to specify the zoom levels.)
  Main Scenario:
    1. The user selects a "zoom level" by navigating using the zoom bar on the selected map.
    2. The user can either choose to set this zoom level as the upper bound or the lower bound for the given article. The upper bound specifies that the article will not be available at zoom levels greater than this value. The lower bound specifies that the article will not be available at zoom levels less than this value.
    3. The user does this for both zoom levels. If the user does not specify the zoom level for either, the default values are used.
  Post Condition:
    The article is only visible within the zoom range specified by the user.
  FIG. 1 shows an exemplary Screen Shot.

EXAMPLE 2

Exemplary E-Marketplace Embodiment

In another exemplary embodiment, an E-Marketplace web-based application example is in some respects similar to the herein described GeoMonkey™ web-based application example, except that instead of monitoring activity related to a user's geospatial content, the 'instructions' monitor activity related to an item offered for sale by a seller.

In particular embodiments, each seller is initially granted a predetermined amount of storage space on the web server, in which they may upload digital photographs, images, descriptions of the item, and other information related to the item for sale. As is appreciated by those of ordinary skill in the art, each seller may offer multiple items for sale at the same time and such embodiments are within the scope of the present invention. Further, persons of ordinary skill in the art will appreciate that E-Marketplace web-based applications (such as those provided by www.eBay.com, www.Amazon.com, and the like) that provide instructions allowing users to list items for sale are well known in the art.

Particular aspects of the present invention provide instructions for monitoring activity related to the item for sale and determining the value of each of the items and/or the value of the seller. For example, the value of an item may be based on at least one of the following data collected by monitoring activity related to the item for sale: the amount of revenue generated by the sale of the item; the number of visitors that view the item; the number of visitors to the item that subsequently request user accounts; the selling price of the item; and the like The value of the items that generate more revenue and/or have a higher selling price may be regarded as greater than that of items that generate less revenue and/or have lower selling prices. Items viewed by more visitors and/or more visitors that subsequently request user accounts may be considered more valuable.

The value of a seller may be based on the data collected by monitoring activity related to the items the seller has offered for sale. Data collected with respect to all of the items offered by the seller or a subset of the items offered may be considered. For example, the data collected may include at least one of: the amount of revenue generated by the sale of the seller's items; the number of visitors to the seller's items that subsequently request user accounts; the number of visitors that view the seller's items; and the like. The value of sellers who generate more revenue and/or have a higher selling price items may be regarded as greater than that of sellers who generate less revenue and/or have lower selling price items. Sellers whose items are viewed by more visitors and/or more visitors that subsequently request user accounts may be considered more valuable.

In particular aspects, the inventive E-Marketplace web-based application includes instructions for determining a reward and/or incentive such as additional storage space on the webserver, access to special features, etc. based on the value of the item and/or the value of the seller and providing that reward to the seller.

EXAMPLE 3

Exemplary E-Photo Storage Site Embodiment

In another exemplary embodiment, an E-Photo Storage Site web-based application example is in some respects similar to the GeoMonkey™ web-based application example, except instead of monitoring activity related to the user's content, the 'instructions' monitor activity related to digital images a user has provided to the E-Photo Storage Site. Initially, each user is granted a predetermined amount of storage space on the website server, in which they may upload digital photographs, images, descriptions of the photographs, and/or other information related to the images. The images may be viewed by or shared with third parties. Persons of ordinary skill in the art appreciate that E-Photo Storage Site web-based applications (such as those provided by www.snapfish.com, www.dotphoto.com, www.kodakgallery.com, and the like) that provide instructions allowing users to post images and share them with others are well known in the art.

The present invention provides instructions for monitoring activity related to the image posted and determining the value of each of the image and/or the value of the user who posted the image. For example, the value of the image may be based on at least one of the following data collected by monitoring activity related to the image: the amount of revenue generated by the image (e.g., via advertising, fees, and/or purchases of copies (or prints) of the image); the number of visitors that view the image; the number of visitors to the image that subsequently request user accounts; and the like. The value of the images that generate more revenue may be regarded as greater than that of images that generate less revenue. Images viewed by more visitors and/or more visitors that subsequently request user accounts may be considered more valuable.

The value of the user may be based on the data collected by monitoring activity related to the images the user has shared. Data collected with respect to all of the images posted by the user or a subset of the images may be considered. The data collected may include at least one of: the amount of revenue generated by the user's images (i.e., via advertising, fees, and/or purchases of copies (or prints) of the images); the number of visitors to the user's images that subsequently request user accounts; the number of visitors that view the user's images; and the like. The value of users who generate more revenue may be greater than that of users who generate less revenue. Users whose images are viewed by more visitors and/or more visitors that subsequently request user accounts may be considered more valuable.

In certain aspects, the E-Photo Storage Site web-based application includes instructions for determining the reward and/or incentive such as additional storage space on the webserver, access to special features, etc. based on the value of the image and/or the value of the user and providing that reward to the user.

The invention claimed is:

1. A computer implemented method for rewarding a user of a web-based application, comprising:
   providing a web-based application for sharing geospatial information on a server accessible by a plurality users using client-server interfaces, wherein the application interface provides for user-directed posting and retrieval from a database operative with the server of user-provided geospatial content relating to the application;
   monitoring, using software operative with the server, use by the plurality of users of geospatial content posted on the server by one specific user of the plurality of users;
   assessing, using software operative with the server and based on the monitored use, an informational value to the plurality of users of the geospatial content posted on the server by the specific user;
   determining, using software operative with the server and based on the assessing, an incentive or reward, based on the assessed value of the geospatial content posted by the specific user; and
   providing, using software operative with the server, the specific user with the determined incentive or reward.

2. The method of claim 1, wherein the web-based application comprises software for at least one of a geospace system for sharing information in a geospatial context, an E-Marketplace web-based application using a client server geographic information system (GIS), and an E-Photo Storage Site web-based application.

3. The method of claim 1, wherein the geospatial, content posted on the server by the specific user comprises at least one of geospatial data, items for sale at a location and location associated digital images for viewing or sale.

4. The method of claim 3, wherein the geospatial data comprises at least one geospatial map associated data types selected from the group consisting of maps, map annotations, map modifications, map path or routes, text, hyperlinks, geospatial data associated electronic files, music files, digital photographs, images and digital multimedia files.

5. The method of claim 1, wherein monitoring use by the plurality of users of geospatial content posted by the specific user comprises the monitoring of any third party activity related to the specific user's posted geospatial content.

6. The method of claim 5, wherein the third party activity is selected from the group consisting of the number of 'hits' the specific user's posted geospatial content receives, the number of times the specific user's posted geospatial content is retrieved from the database, the number of unique users viewing the specific user's posted geospatial content, the number of users opening a user account after viewing the specific user's posted geospatial content, and the number of sale items viewed or purchased based on the specific user's posted geospatial content.

7. The method of claim 1, wherein advertising information is associated with the specific user's posted geospatial content, and monitoring comprises determining the total amount of advertising revenue generated based on third party viewing of the specific user's posted geospatial content-associated advertisement.

8. The method of claim 1, wherein third party users are charged to view the specific user's geospatial content, and monitoring comprises determining a total amount of revenue generated by viewing of the specific user's posted geospatial content.

9. The method of claim 1, wherein the application comprises a geospace system for sharing information in a geospatial context having a zoom level feature wherein user-specific posted geospatial content is associable with one or more zoom levels, and wherein monitoring comprises tracking of a combination of zoom level, location, and time spent viewing a location at a specific zoom level, uniquely allowing identification of a specific user subset.

10. The method of claim 1, wherein assessing the information value of the geospatial content posted by the specific user comprises at least one of determining a number of 'hits' received by the specific user's posted geospatial content, determining the number of times the specific user's posted geospatial content is retrieved from the database, determining the number of unique users viewing the specific user's posted geospatial content, determining the number of users opening a user account after viewing the specific user's posted geospatial content, determining the total amount of advertising revenue generated based on third party viewing of user-specific posted geospatial content-associated advertisement, determining a total amount of revenue generated by viewing of the specific user's posted geospatial content, and determining the number of sale items viewed or purchased based on specific user's posted geospatial content.

11. The method of claim 1, wherein determining an incentive or reward, based on the assessed informational value of the geospatial content posted by the specific user comprises at least one of determining an amount of additional storage space on the server, determining an amount of access to special features of the web-based application, determining an amount of access to "professional" or subscription fee-based tools, determining an amount of access to cooperative third party web-based services, and determining an amount of free publicity or promotion.

12. The method of claim 1, wherein providing the specific user with the determined incentive or reward comprises at least one of providing an amount of additional storage space on the server, providing an amount of access to special features of the web-based application, providing an amount of access to "professional" or subscription fee-based tools, providing an amount of access to cooperative third party web-based services, and providing an amount of free publicity or promotion.

13. The method of claim 1, further comprising determining a value of the specific user, based on the informational value of the user-specific posted geospatial content or a subset thereof.

14. A computer network apparatus or system for rewarding a user of a web-based application, comprising:
 a server having a processor and at least one storage device connected to the processor;
 a server-based application for sharing geospatial information on a server accessible by a plurality users using client-server interfaces, wherein the application interface provides for user-directed posting to, and retrieval from a database operative with the server of user-provided geospatial content relating to the application;
 a database of content posted by the plurality of users; and
 a stored software program operative with the processor to monitor use by the plurality of users of content posted by one specific user of the plurality of users, assess an informational value to the plurality of users of the geospatial content posted on the server by the specific user, and determine an incentive or reward, based on the assessed value of the geospatial content posted by the specific user; and provide the incentive or reward to the specific user.

15. The apparatus or system of claim 14, wherein the server-based application comprises at least one of a geospace system for sharing information in a geospatial context, an E-Marketplace web-based application using a client server geographic information system (GIS), and an E-Photo Storage Site web-based application.

16. The apparatus or system of claim 15, wherein the content posted by the specific user comprises at least one of geospatial data, items for sale at a location, and location associated digital images for viewing or sale.

17. A method of data mining, comprising:
 providing a web-based geospace application for sharing information on a server in a geospatial context accessible by a plurality users using client-server interfaces, wherein the application interface provides for user-directed posting to and retrieval from a database operative with the server of user-provided geospatial data content relating to the application;
 monitoring, using software operative with the server, use by the plurality of users of geospatial data content posted on the server by one or more users of the plurality of users;
 assessing, using software operative with the server and based on the monitored use, an informational value to the plurality of users of the geospatial content posted on the server by the one or more users of the plurality of users;
 identifying using software operative with the server and based on the monitoring and assessing, a subset of users based on the monitored use of a defined subset of the posted geospatial data content; and
 providing the identified user subset to an acquiring entity for use in targeting, soliciting or otherwise interacting with the subset of users.

18. The method of data mining of claim 17, wherein the geospatial data comprises at least one selected from the group consisting of maps, map annotations, map modifications, map path or routes, text, hyperlinks, geospatial data associated electronic files, music files, digital photographs, images and digital multimedia files.

19. The method of data mining of claim 17, wherein the geospace application for sharing information in a geospatial context comprises a zoom level feature wherein user-specific content is associable with one or more zoom levels, and wherein at least one of monitoring and assessing comprises tracking of a combination of zoom level, location, and time spent viewing a location at a specific zoom level, uniquely allowing identification of a specific user subset.

* * * * *